Sept. 7, 1954      A. A. HOLLAND      2,688,406
FILTERING APPARATUS
Filed May 7, 1951      2 Sheets-Sheet 1
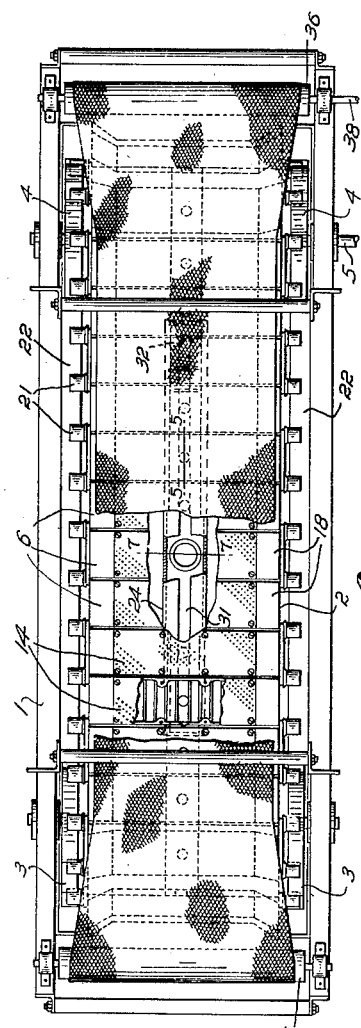
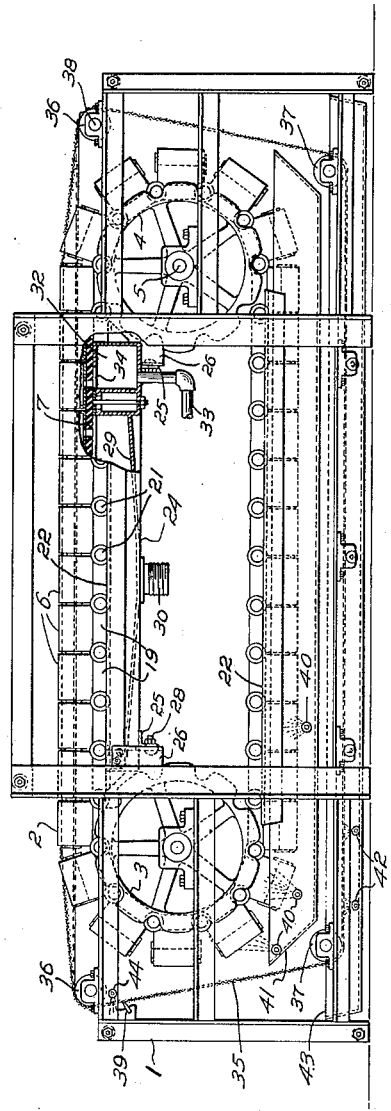
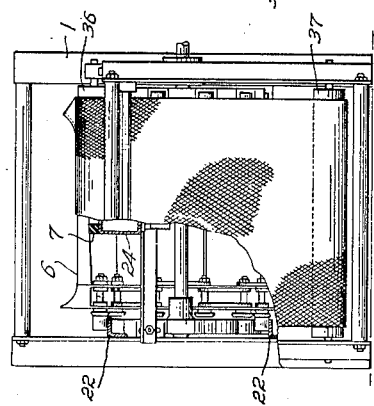
INVENTOR.
Arthur A. Holland
BY
Alex E. Macdae
Attorney.

Sept. 7, 1954   A. A. HOLLAND   2,688,406
FILTERING APPARATUS
Filed May 7, 1951   2 Sheets-Sheet 2
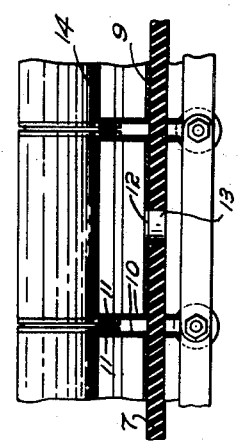
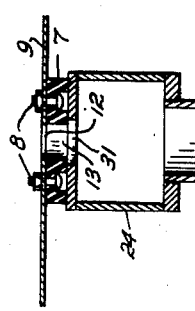
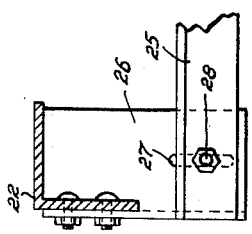
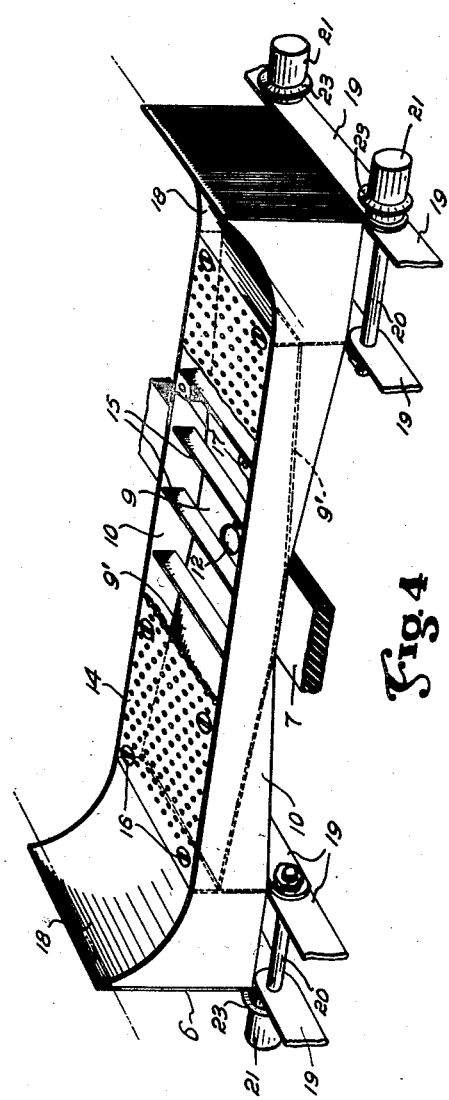
INVENTOR.
Arthur A. Holland
BY
Alex K. MacRae
Attorney.

Patented Sept. 7, 1954

2,688,406

UNITED STATES PATENT OFFICE 2,688,406

FILTERING APPARATUS

Arthur A. Holland, Pensacola, Fla.

Application May 7, 1951, Serial No. 225,010

16 Claims. (Cl. 210—198)

This invention relates to filtering apparatus for separating solids from mixtures of liquids and solids.

An object of the invention is to provide a simple, efficient filtering machine which is more economical in operation and subject to more convenient operating control and maintenance than machines heretofore proposed.

The invention contemplates the provision, in association with an endless filter band, of a flexible filter mat composed of a plurality of interconnected, rigid, traylike elements arranged to provide a solid, rigid base for the filter band during the filtering operation and to ensure more effective formation and separation of the filter cake, convenience of washing of the filter band and mat, and ease of maintenance.

The invention will be described with reference to the accompanying drawings, in which Fig. 1 is a side elevation of the filtering machine in accordance with the invention, Fig. 2 is a plan view, Fig. 3 is an end elevation, Fig. 4 is a perspective view of one of the traylike elements, Fig. 5 is a partial sectional view on line 5—5 of Fig. 2, Fig. 6 is a detail end elevation of a suction box supporting means, and Fig. 7 is a partial sectional view on line 7—7 of Fig. 2.

Referring to the drawings, the apparatus comprises a frame 1 in which is mounted in generally horizontally disposed position an endless filter mat 2 on pairs of complementary sprockets 3 and 4. Sprockets 4, which are preferably located at the head or feed end of the machine, are driven by means of any suitable driving connection on their supporting shaft 5.

The filter mat 2 comprises a plurality of trays or traylike elements 6. Each tray is generally rectangular in shape and is mounted in transversely extending relation on a narrow, flexible belt or band 7 of rubber or the like, as by means of bolts 8 extending through the bottom wall 9 of the tray. The side walls 10 of each tray are in abutting or closely adjacent relation to the side walls of adjacent trays, and preferably sealing means are provided between each pair of adjacent walls, such means comprising, as shown, a strip 11 of rubber or like material carried on the outer surface of each wall 10 and arranged to sealingly abut each other when the trays are in horizontal position. The sections 9' of the bottom wall 9, on each side of the midsection which engages the belt 7, are downwardly inclined towards such midsection to provide liquid flow down into such midsection when the tray is disposed on the upper horizontal travelling portion of the belt. The midsection of each bottom wall 9 is provided with a liquid outlet opening 12 which registers with a corresponding opening 13 in the belt 7.

Each tray is provided with a perforated cover plate or grid 14, which is seated on ribs 15 and is secured to the tray as by screws 16 engaging posts 17. The grid 14 may, if desired, be mounted in hinged relation to the tray. It is important that the grid have a plane upper surface disposed in the same horizontal plane as that of the other grids on the upper travelling portion of the belt 7, and that such surface be located not higher than the upper edges of the side walls 10 of the tray.

Each end portion of the tray has an upwardly extending curved surface 18 beyond the end of the grid 14. Each end portion of the tray is supported upon a pair of links 19 pivotally interconnected by means of the rods 20 and constituting a supporting chain. Each rod 20 has a laterally projecting end on which is mounted a roller 21 engaging upper and lower pairs of supporting tracks 22. Each roller is provided with a retaining flange 23. It will be observed that the rollers 21 serve as the sprocket slot-engaging members of the chain, the teeth on sprockets 3 and 4 being arranged accordingly, as shown.

A suction box 24 is suitably supported in the frame below the upper travelling portion of belt 7 and in engagement with the under surface thereof. As shown, each end of the box is carried by a transversely extending bar 25 bolted at each end to a bracket 26 suspended from the upper track 22. Preferably, the supporting means includes means for adjusting the vertical position of the box 24 to vary its bearing pressure, as required, on the belt 7. As shown, this means comprises a vertical slot 27 in each bracket 26 through which the attaching bolt 28 extends.

The box 24 is of long, narrow, rectangular shape, as shown, and has a bottom wall 29 of shallow, conical shape provided at its lowermost point with an outlet nipple 30 for attachment to a vacuum connection, not shown. The box has in its top wall a longitudinally extending slot 31, in alignment with the openings 13 in the belt 7 and registering with such openings as they travel over the slot. The slot is of approximately the same width as the diameter of the openings.

Preferably, the suction box 24 carries, at one end thereof adjacent the feed end of the machine, a small pressure box 32 adapted to be supplied with air under pressure through the pipe connection 33 in the bottom wall thereof. The box 32 has an opening 34 in the top wall thereof, also in alignment with the openings 13 in the belt 7 and adapted to register therewith as the belt travels over the same.

An endless filter belt 35 of suitable porous or foraminous filter medium material such as metal or plastic screening, fabric or the like is mounted on a pair of upper rollers 36 and a pair of lower rollers 37, suitably mounted in the frame, as as shown. The upper rollers 36 support the upper travelling portion of the filter in substantially the horizontal plane of the surfaces of the grids 14 during the upper horizontal travelling movement thereof whereby the filter rests upon and travels with such surfaces during such movement, roller 36 at the feed end of the machine being provided with driving means (not shown) for imparting rotative movement to its shaft 38. It will be apparent that the belt 35 and the trays 6 should travel at substantially the same speed.

Roller 36 at the feed end of the machine is positioned forwardly beyond sprockets 4 and roller 36 at the discharge end of the machine is positioned rearwardly beyond sprockets 3. Thus, filter belt 35 has a portion at each end of the machine which extends horizontally beyond the ends of the horizontal travelling portion of the filter mat 2. Roller 37 at the discharge end of the machine is forwardly offset from adjacent roller 36 to provide a free space below such roller 36 for discharge of the filter cake. A scraper 39 may be provided just below discharge roller 36 to assist in removing the filter cake from the belt 35. The cake may be subjected to a loosening action just prior to its engagement by the scraper by means of a compressed air or steam jet 44. The trays 6 are preferably washed during their lower return travelling movement as by means of sprays 40, a pan 41 being provided to receive the wash liquid. Belt 35 is also preferably washed during its return movement as by means of sprays 42, a pan 43 being likewise provided to receive the wash liquid.

The filter belt 35 is of such width that when it engages the grids of the trays 6, its marginal portions will be engaged by the surfaces 18 thereby to impart a trough-like contour to the upper travelling portion of the belt 35. Thus, the need for separate deckles is avoided and a substantial quantity of material to be treated may be placed thereon.

In operation, the material to be filtered is fed onto the filter belt at the forward end of the machine and is subjected to a distributing action on the belt by means of air under pressure from the pressure box 32. Thereafter, the material is subjected to vacuum during its horizontal movement, as will be apparent from the foregoing description.

Since discharge roller 36 is of comparatively small diameter (being preferably less than one-quarter that of sprockets 3 or 4) the sharp curvature imparted to the filter cake results in breakage and discharge of the same from the belt 35. The jet 44 and scraper 39 assist in such discharge.

Complete separation of the filter belt 35 from the filter mat 2 following the upper horizontal movement facilitates thorough washing of each element during its return movement, since there is convenient access to all portions thereof during such return movement. This is important particularly, for instance, in the treatment of sodium sulphate, wherein a film of anhydrous sulphate forms under the filter belt and on top of the filter mat. This film is difficult to remove with the usual type of filtering apparatus but is readily removed when the present machine is employed without interrupting the continuous operation thereof.

The present invention also makes possible the use of a fully rigid filter mat while at the same time ensuring ease of movement thereof due to the employment of wheel or roller-supported tray elements. The structure described makes possible the provision of any desired degree of pressure between the suction box and belt 7.

It will moreover be apparent that all portions and parts of the machine are readily accessible for replacement and maintenance.

I claim:

1. Filtering apparatus comprising a frame, an endless filter mat mounted for travelling movement in the frame, said mat comprising a belt of inherently flexible material, a plurality of rigid inflexible trays fixed to said belt, supporting members carried by each tray, each said tray having means forming a plane filter face thereon, said filter faces of a plurality of said trays lying in a common substantially uninterrupted plane during a portion of travel of said trays, and tracks mounted in the frame and engaged by said supporting members, a foraminous endless filter member mounted for travelling movement in the frame and engaging said filter faces throughout said portion of travel, said belt having a plurality of passages therein each communicating with one of said trays, and means for imparting suction to said passages during said portion of the travel of said strays.

2. Filtering apparatus comprising a frame, an endless filter mat mounted for travelling movement in the frame and having upper and lower normally horizontally disposed directions of movement, said mat comprising a belt of inherently flexible material, a plurality of rigid inflexible trays fixed to said belt, each said tray having means forming a plane filter face thereon, said filter faces of a plurality of said trays lying in a common substantially uninterrupted plane during at least said upper direction of movement of said trays, and track means in the frame supporting said trays during said directions of movement, a foraminous endless filter member mounted for travelling movement in the frame and resting upon said filter faces during said upper direction of movement, each said tray having an opening in its bottom wall, said belt having complementary openings therein each registering with one of said tray openings, and a suction box having a top wall engaging the lower surface of said belt, said top wall having a slot therein aligned with said belt openings.

3. Filtering apparatus comprising a frame, an endless filter mat mounted for travelling movement in the frame and having upper and lower normally horizontally disposed directions of movement, said mat comprising a flexible belt, a plurality of rigid, rectangular trays extending transversely of said belt and fixed thereto, means supporting each of the end portions of the trays, rollers carried by each of said supporting means, tracks mounted in the frame and supporting said rollers during said upper and lower directions of movement, and sprockets constituting said mounting means and engaged by said rollers, each tray having means forming a plane filter face thereon, said filter faces of a plurality of said trays lying in a common substantially uninterrupted plane during at least said upper direction of movement of said trays, an endless foraminous filter member mounted for travelling movement in the frame and engaging said trays throughout said upper horizontal direction of movement, said belt having a plurality of passages therein each communicating with one of said trays, and means for imparting suction to said passages during said upper horizontal direction of movement.

4. Filtering apparatus as defined in claim 3, each side wall of each tray being closely adjacent the side wall of an adjacent tray to place the filter faces of adjacent trays in substantially adjoining relation, and means sealing the space between said adjacent side walls.

5. Filtering apparatus as defined in claim 3, said suction imparting means including a suction box mounted in the frame in engagement with said belt during its upper horizontal direction of movement, said belt passages communicating with said box, and means for vertically adjusting the position of said box to vary the pressure between the box and belt.

6. Filtering apparatus as defined in claim 3, said filter face forming means comprising a grid constituting a cover for the tray, each said tray also having curved end walls extending outwardly beyond the plane of said filter face, said end walls being arranged to impart a troughlike shape to said filter member during said upper direction of movement.

7. Filtering apparatus comprising a frame, an endless filter mat mounted for travelling movement therein, said mat comprising a plurality of interconnected, separate, traylike elements, each said element having means forming a plane filter face thereon, said filter faces of a plurality of said elements lying in a common substantially uninterrupted plane during a portion of travel of said elements, a porous filter belt for receiving material to be filtered also mounted for travelling movement in said frame and engaging said filter faces throughout said portion of travel, each said traylike element having end walls arranged to impart a troughlike shape to said filter belt throughout said portion of travel, and suction means acting solely upon the traylike elements of said mat and upon that portion of the filter belt in contact with said mat and arranged to have said material to be filtered thereon.

8. Filtering apparatus as defined in claim 7, including a feed distributing device comprising means for applying air under pressure to said belt adjacent the feed end thereof.

9. Filtering apparatus as defined in claim 7, said suction applying means including a suction box, and a pressure box, said belt having openings therein and each of said boxes having an opening therein in alignment with said belt openings and arranged to register therewith as said belt travels thereover.

10. Filtering apparatus as defined in claim 7, each side wall of said traylike element being closely adjacent the side wall of an adjacent traylike element, and sealing means extending along and carried by at least one of said side walls and arranged to seal the space between said adjacent side walls when the traylike elements are in said portion of their travel.

11. Filtering apparatus as defined in claim 7, said filter face forming means comprising a grip hinged to a wall of said element and constituting a cover therefor.

12. Filtering apparatus as defined in claim 7, each said element having side and end walls, said filter face forming means comprising a grid seated on said side walls, the outer surface of said grid being not higher than the edges of said side walls.

13. Filtering apparatus as defined in claim 7, said suction means including an endless flexible belt member having a plurality of separate passages extending therethrough, each of said traylike elements having a port therein registering with one of said passages during said portion of travel.

14. Filtering apparatus as defined in claim 7, said filter belt having a feed end adjacent one end of said portion of travel and a discharge end adjacent the other end of said portion of travel, and means carried by the frame for directing a cleaning fluid against said filter belt at a point adjacent said discharge end.

15. Filtering apparatus comprising a frame, an endless filter mat mounted for travelling movement therein, said mat comprising a plurality of interconnected, separate traylike elements, each said element having means forming a plane filter face thereon, said filter faces of a plurality of said elements lying in a common substantially uninterrupted plane during a portion of travel of said elements, a porous filter belt also mounted for travelling movement in said frame and engaging said filter faces throughout said portion of travel, said porous filter belt being in contact solely with said mat during said portion of travel, each said traylike element having end walls arranged to impart a troughlike shape to said filter belt throughout said portion of travel, and means for applying suction to said mat.

16. Filtering apparatus comprising a frame, an endless filter mat mounted for travelling movement therein, said mat having an upper, substantially horizontally disposed travelling portion and comprising a plurality of interconnected, separate, traylike elements, each said element having means forming a plane filter face thereon, said filter faces of a plurality of said elements lying in a common substantially uninterrupted plane during said travelling portion, a porous filter belt also mounted for travelling movement in said frame and having an upper, substantially horizontally disposed travelling portion engaging and in sole contact with said upper travelling portion of the belt throughout the length of the latter portion, and extending beyond each end of the said latter portion, each said traylike element having end walls arranged to impart a troughlike shape to said filter belt throughout said portion of travel, and means for applying suction to said mat.

References Cited in the file of this patent

UNITED STATES PATENTS

| Number | Name | Date |
|---|---|---|
| 910,075 | Lynch | Jan. 19, 1909 |
| 1,793,449 | Bassler | Feb. 17, 1931 |
| 1,862,050 | Donaldson | June 7, 1932 |
| 2,097,529 | Nordell | Nov. 2, 1937 |
| 2,314,294 | Wallny | Mar. 16, 1943 |
| 2,549,729 | Wallny | Apr. 17, 1951 |